US006570917B1

(12) United States Patent
Lai et al.

(10) Patent No.: US 6,570,917 B1
(45) Date of Patent: May 27, 2003

(54) EQUALIZER TRAINING IN THE PRESENCE OF NETWORK IMPAIRMENT

(75) Inventors: Yhean-Sen Lai, Warren, NJ (US);
Zhenyu Wang, Morganville, NJ (US);
Jiangtao Xi, West Wollongong (AU);
Bahman Barazesh, Marlboro, NJ (US)

(73) Assignee: Agere Systems Inc., Allentown, PA (US)

( * ) Notice: Subject to any disclaimer, the term of this patent is extended or adjusted under 35 U.S.C. 154(b) by 0 days.

(21) Appl. No.: 09/338,664

(22) Filed: Jun. 22, 1999

Related U.S. Application Data

(60) Provisional application No. 60/123,737, filed on Mar. 10, 1999.

(51) Int. Cl.$^7$ .............................................. H03K 5/159
(52) U.S. Cl. ........................................................ 375/232
(58) Field of Search .................................. 375/232, 233, 375/234, 317

(56) References Cited

U.S. PATENT DOCUMENTS

| | | |
|---|---|---|
| 5,394,437 A | 2/1995 | Ayanoglu et al. |
| 5,471,504 A | 11/1995 | Lee et al. |
| 5,513,216 A | 4/1996 | Gadot |
| 5,528,625 A | 6/1996 | Ayanoglu et al. |
| 5,604,769 A | 2/1997 | Wang |
| 5,831,561 A | 11/1998 | Cai et al. |
| 5,881,108 A | 3/1999 | Herzberg et al. |
| 5,949,819 A * | 9/1999 | Bjarnason et al. .......... 375/222 |
| 5,999,564 A | 12/1999 | Dagdeviren |
| 6,047,022 A | 4/2000 | Rueven |
| 6,381,266 B1 * | 4/2002 | Zhang et al. ................ 375/222 |

* cited by examiner

Primary Examiner—Stephen Chin
Assistant Examiner—Kevin Kim (57) ABSTRACT

Analog modems are enabled to better learn the slicing levels employed at the interface to a digital transmission network by reducing the effects of the various noise sources. Initially a training sequence is received to preliminarily adjust the analog modem's equalizer. Thereafter, a special training sequence, protected against intersymbol interference, is employed to collect samples of each slicing level, to ascertain the least mean squared value of each slicing level from the received samples and to obtain the channel's impulse response at each slicing level. To mitigate the effects of robbed bit signaling that may be employed in the digital transmission network, an array of slicers is provided to determine which bit position is being robbed and to base level learning on samples obtained from the non-robbed positions.

6 Claims, 7 Drawing Sheets

EQUALIZER TRAINING IN THE PRESENCE OF NETWORK IMPAIRMENT

This application claims the benefit of U.S. Provisional Application No. 60/123,737, filed Mar. 10, 1999.

FIELD OF THE INVENTION

This invention relates to transmission of digital signals over communications networks and, more particularly, to measures for improving the accuracy of such transmission.

BACKGROUND OF THE PRIOR ART

The transmission of digital data over a bandlimited channel, such as the analog voice channel of the local loop plant can be impaired in different ways. The impairments that most severely limit data rates are: intersymnbol interference, channel noise, analog signal distortion (introduced by analog circuitry in the modem, digital to analog converters, central office line cards, codec filters and the local loop), network impairment and quantization noise. Intersymbol interference (ISI) arises when the frequency spectrum of the transmitted signal is not uniformly accommodated by the channel's passband—causing neighboring data symbols in a transmission sequence to spread out and interfere with one another. This problem may be addressed by using an equalizer (a form of filter) to compensate for the channel's linear (amplitude and phase) distortion. A decision feedback equalizer (FB) may be employed in addition to the linear, or feed forward, equalizer to further reduce ISI and network noise. In conventional practice, the equalizer is trained by using a pre-defined training signal using a small number of constellation points such as a positive and a negative signal of the same absolute value. The problem is that such "two-level" training may not be appropriate for the entire range of signal levels and may not be appropriate for all of the different kinds of network impairment. Imperfect adjustment of an equalizer results in a distortion that may be called "equalizer noise".

Channel noise includes thermal or "white" noise, transients and quantization noise. Quantization noise is inversely dependent on the number of quantization levels. In practical systems where the number of quantization levels is fixed, quantization noise depends on the difference between the quantization levels employed by the digital to analog converter (DAC) at a client (analog) modem at one end of the loop, and the analog to digital converter (ADC) at the network interface to the public switched telephone network (PSTN), at the other end of the loop. A client modem maps specific bit patterns within the user's data stream to different symbols. The DAC in the client modem converts the symbols to a unique analog signal for transmission over the loop to the network interface which contains an ADC to convert the received analog into digital bit patterns for transmission through the PSTN. The most efficient method to maximize data throughput in the voice telephone network is for the client modem to use the actual slicing levels employed at the network codec and for it to synchronize its transmissions to the network clock. Such a scheme is disclosed in Ayanoglu et al, U.S. Pat. No. 5,394,437 issued to the assignee of the present application. The problem is that ascertaining the slicing levels is not independent of equalizer adjustment.

Network impairment is comprised of a wide range of digital transformations that take place in the telephone network after analog to pulse code modulation (PCM) conversion. For example, the conventional D2 channel-bank pattern employs the 193rd bit of odd frames to provide a repeating pattern 1010 . . . for framing synchronization. The 193rd bit of even frames is utilized to provide a repeating pattern 000111 . . . for identification by 01 and 10 transitions of the sixth and twelfth frames. The eighth bit of each channel may then be preempted for supervisory signaling related to the respective channel. While such "robbed bit" signaling may not be noticeable when the channel is carrying ordinary speech, the preemption of a bit position from the data stream injects a certain amount of noise in the channel that can have important ramifications, particularly during equalizer training. While some modems choose a signaling level for equalizer training that is not used for supervisory signaling, some transmission lines may preempt any signaling level for supervisory purposes and therefore inject noise into the channel that will slow down equalizer training.

In the copending application of Dagdeviren-13, Ser. No. 08/829,274, entitled "System and Method for Iteratively Determining Quantization Intervals of a Remote ADC and Modem Employing the Same," now U.S. Pat. No. 5,999,564, (the subject matter of which is hereby incorporated by reference), a system is described for determining the actual quantization intervals of the ADC in the network interface and for setting analog signaling levels of the client modem's DAC to correspond to the actual, rather than ideal, quantization intervals. Briefly, the client modem sends a training sequence of "probe" signals to a central device in the network which analyzes the sequence and responds indicating whether the probe signals were higher or lower than the actual thresholds. This system requires two-way transmission of information between the client modem and the central analyzing device.

L. Cai et al, U.S. Pat. No. 5,831,561, issued Nov. 3, 1998 discloses an improvement on the aforementioned Dagdeviren-13 application in which the symbol table employed in the client modem is configurable as a function of the quantization intervals used by the ADC in the network interface so that the maximum possible minimum separation exists between adjacent values.

The above-described prior art systems determine the actual quantization intervals independently of signaling channel equalization (or assume perfect equalization of the signaling channel prior to ascertaining the quantization levels). As a consequence, the compensation for network impairment is only imperfectly achieved because the determination of the quantization thresholds is not independent of the equalizer adjustment and the adjustment of the equalizers is not independent of the slicing thresholds. This gives rise to inaccurate equalizer adjustment which reduces the accuracy of quantization level determination and hence reduces the number of usable PCM levels which, in turn, reduces the data throughput.

SUMMARY OF THE INVENTION

In accordance with one aspect of the principles of the present invention, successive procedures are implemented to reduce the effects of the various noise sources and particularly, the noise introduced in a digital communications path by the communications network preempting bit positions from the data stream. The analog modem is provided with an individual slicer table for each bit position which may be subjected to repetitive preemption by the network. Each slicer table is devoted to learning the correct value of a training symbol occurring during a corresponding one of the bit positions. Initially, the channel impairment is ignored and the analog modem's equalizers are trained in any convenient way, that is, with the slicers frozen at some predetermined level. After the equalizers have been preliminarily adjusted close to convergence, a level-learning procedure is implemented to train the n slicer tables.

Advantageously, the level-learning procedure may employ the 3-part training sequence disclosed in the copending application of the present inventors entitled "Improved Training of Level Learning Modems," filed of even date hereof and assigned Ser. No. 09/337,687. Briefly, a first part of the training sequence is an all-zero or guard interval sub-segment which insulates the current training sequence against intersymbol interference from any preceding sequence. The duration of the guard interval is selected so that any "spread" remaining after a previous sequence will have become sufficiently attenuated. The next part of the sequence is a sub-segment containing one or more level point signals each followed by a set of zero levels sufficient to insulate each level point signal against intersymbol interference from any other signals for that level. This second sub-segment establishes an initial value for the level to facilitate the analog modem's decision on what the level point is and also to ascertain the channel's impulse response at that signal level. The third part of the training sequence is a sub-segment which contains additional level points of varying polarity spaced to approximate the maximum repetition rate to be used by the analog modem.

As claimed in the copending application of the present inventors entitled "Apparatus and Method for Adapting a Filter of an Analog Modem," Ser. No. 09/338,134, filed of even date hereof, the mean squares error (MSE) between slicer input and output is measures. If the error is within predetermined bounds, the setting of both the feed forward (FF) and feed backward (FB) filters are advantageously frozen, and subsequent (advantageously, the third sub-segments thereof) are used to adaptively update the slicer table to learn the remaining slicer levels. If the mean square error is somewhat larger (but less than some predetermined threshold amount), the taps of the feed backward filter (FB) are frozen and the feed forward filter (FF) is fine tuned for each slicing level ascertained using the channel impulse response obtained for that slicing level, while continuing to update the slicer table until the MSE is below the predetermined threshold. If the mean square error is larger than the predetermined threshold, both the FF and FB filters are fine tuned while continuing to update the slicer table.

In this way the various noise sources are expeditiously dealt with.

BRIEF DESCRIPTION OF THE DRAWING

The foregoing and other features of the present invention may become more apparent from a reading of the ensuing description and accompanying drawing, in which.

DETAILED DESCRIPTION

Figure 1:
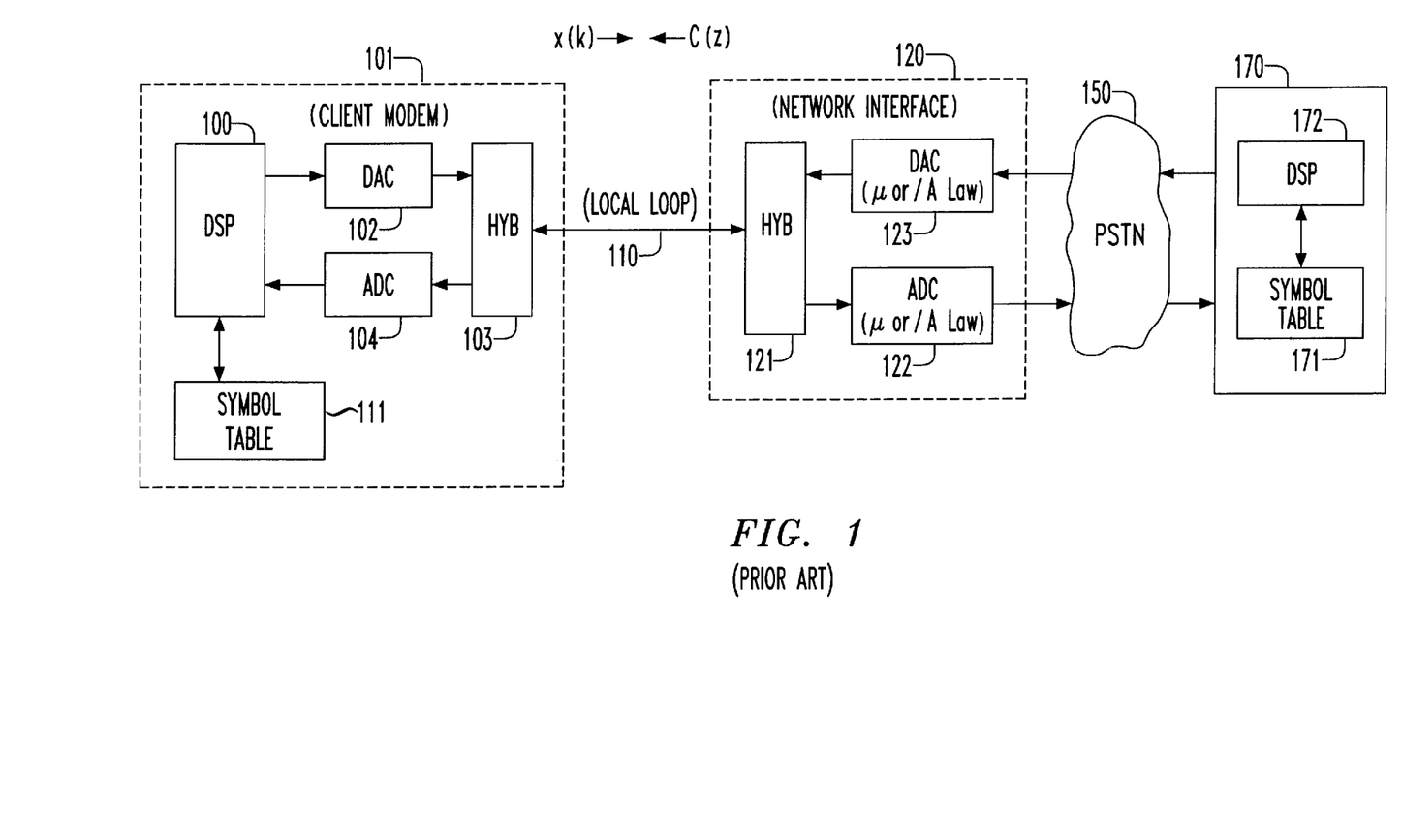
FIG. 1 shows the transmission path extending from a client analog modem over an analog line to the public switched telephone network and from the public network to a digital modem.

FIG. 1 shows, at the left, an analog modem 101 connected to the public switched digital network (PSTN)150 by a local loop 110. The current PSTN in the United States is largely a digital network in which transmission from one central office to another is digital. Internet service providers and others may connect to the PSTN through digital links such as the well-known T-1 system which directly accommodates digital modems.

To transmit data over the local loop, the client modem 101 must include a digital to analog (DAC) converter 102 to send data towards ("upstream") the PSTN and an analog to digital (ADC) converter 104 to receive data ("downstream") from the PSTN. For simplicity, the digital to analog functions are shown as being performed by a separate DAC 102 and the analog-to-digital functions are shown as being performed by a separate ADC 104. However, it is well-known that such functions, as well as equalization to minimize intersymbol interference ("ISI") may be incorporated in a digital signal processor DSP 100 within the client modem. A hybrid 103 is provided in modem 101 to accommodate two-way transmission over the conductors of the local loop.

At the network interface 120, a similar hybrid 121 is provided. Network interface 120 includes an ADC 122 and DAC 123 which convert between the analog signals used on the local loop and either the mu-law or A-law signal compression used in the public switched digital network. The mu-law algorithm includes 255 discrete signal conversion values which are more closely spaced together for small analog signal values and spread further apart for large signal values, while A-law uses 256 values. Each quantization interval is defined by lower and upper analog voltage thresholds, the upper threshold for an interval being the lower threshold for the next highest quantization interval.

When an analog signal transmitted by the client modem over the local loop is received by the ADC 122 in network interface 120, the signal is converted to a unique symbol at a quantization level corresponding to the analog signal value. Similarly, DAC 123 converts digital signals received from the public switched digital network to one of 255 unique analog signaling levels for transmission over the analog local loop 110 to the client modem 101.

As disclosed in the aforementioned N. R. Dagdeviren-13, U.S. patent application Ser. No. 08/829,274, a central site digital device 170 may be employed to analyze how the probe signals sent by client modem 101 through network interface 120 are converted by the network interface. The digital device then responds to the client modem with a signal indicating whether the probe signal was above or below a threshold employed at the network interface. Analog modem 101 stores the results for each level, correlates them with the transmitted probe signals and employs an algorithm to determine the average value for each level. A symbol table 111 is constructed which stores the constellation of symbol values to be employed in transmitting data to network interface 120 so that the symbols that are transmitted will correspond to the signal conversion values employed at the network interface.

However, when a digital device such as 170 is connected to the digital network via a T-1 line which uses "robbed bit signaling" for supervisory purposes, it is not always possible to encode the digital data with 8 bits per sample. This impairs the ability of the ADC 122, and ADC 104, to correctly discriminate between closely-spaced analog signaling levels of DAC 102, and DAC 123, respectively. Accordingly, several, e.g., 100 or 1000 probe signals may be required to be sent to determine the average threshold value for each quantization level, requiring several seconds to establish the values for symbol table 111.

Figure 2:
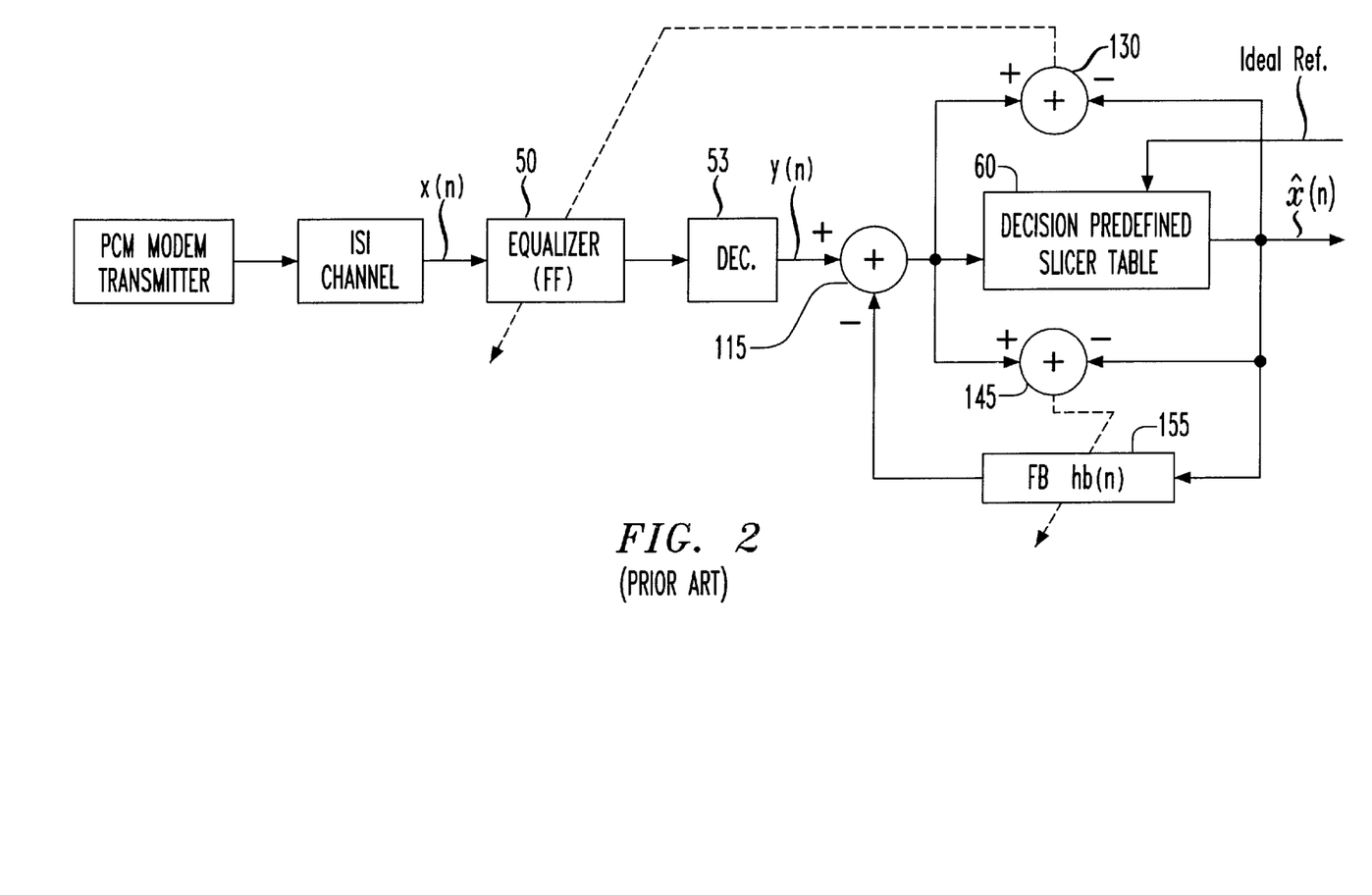
FIG. 2 schematically shows a prior art analog modem employing a predefined slicer table having fixed levels for training the linear equalizer.

Referring now to FIG. 2 there is schematically illustrated a prior art client modem, such as modem 101 of FIG. 1 which employs a feed forward filter 50, decision feedback filter FB 155 and slicer table 60. Such a prior art system is disclosed, for example, in U.S. Pat. No. 5,604,769 assigned to the assignee of the present invention. A received data signal is applied to feed forward filter 50 via sampler or decimator 53 and adder 115. Filters 50 and 155 are adjusted by using the error signals developed by adders 130 and 145, respectively. Conventionally, the predefined slicer table 60 is furnished with the ideal threshold level and linear equalizer 50 is trained on positive and negative versions of that level, i.e., a "two-level" training signal is received on which the equalizer is adjusted. Feedback filter 155 is a finite-impulse-response (FIR) having an impulse response represented by vector f(n). Filter 155 uses the estimate $\hat{x}(n)$ of the transmitted data to predict the amount of ISI, represented by y(n), to be removed from the received signal at adder 145.

The decision feed back structure of FIG. 2 employing FB feedback equalizer 65 is based on the assumption that $\hat{X}(n)$ is a good estimation of the transmitted data x(n). As long as this estimate of the transmitter symbol currently received is, in fact, correct, the right level is fed back. However, if the estimate of the currently received symbol is wrong as, for example, may occur if the slicer 60 has not been properly set, then the feedback section adds this error to the next received symbol and error propagation occurs. Accordingly, training the equalizer filters when the slicer has been adjusted for only an ideal reference signal leaves much to be desired.

Figure 3:
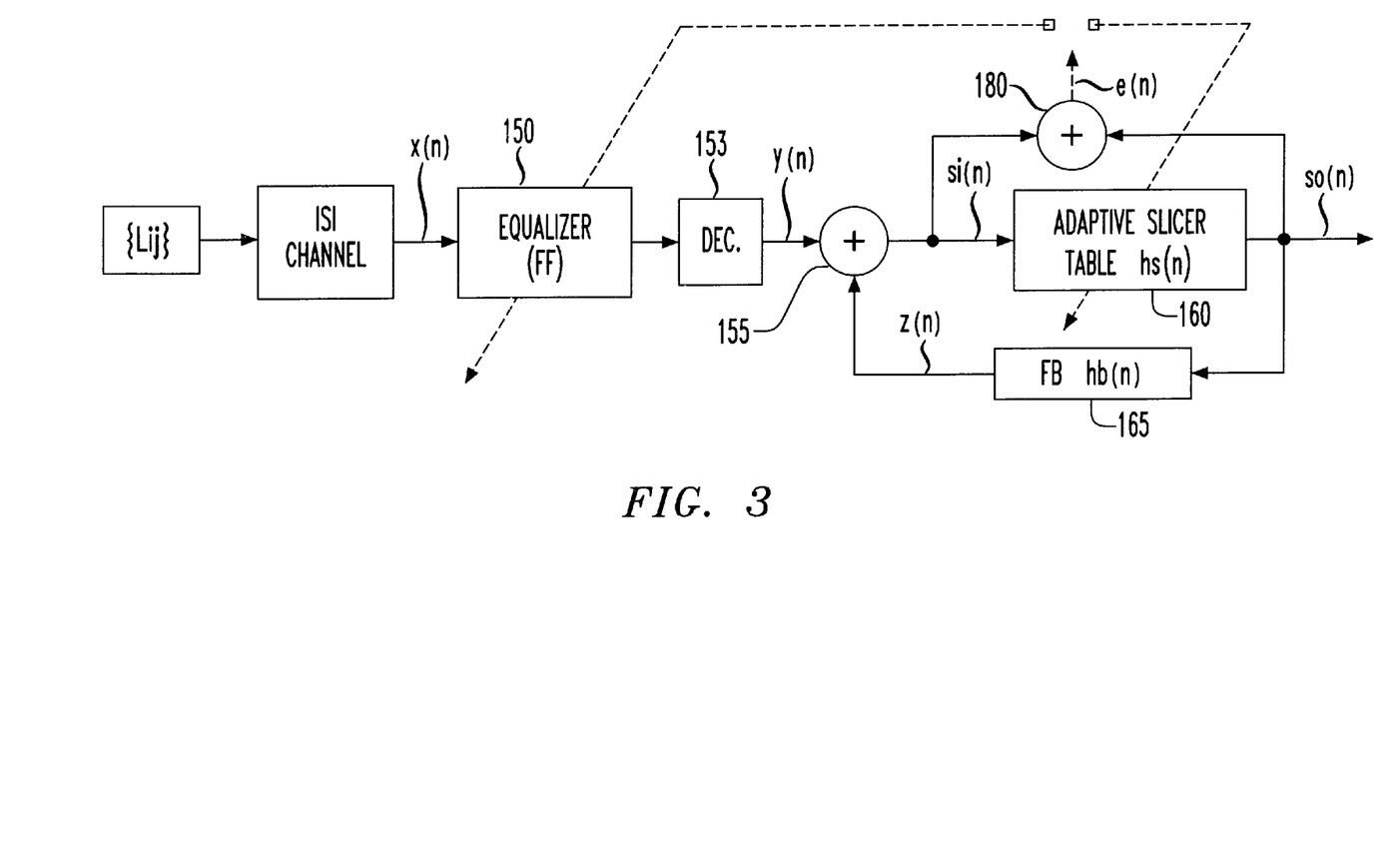
FIG. 3 shows an improved analog modem in which the slicer table is adaptively updated by the special training sequence.
Figure 5:
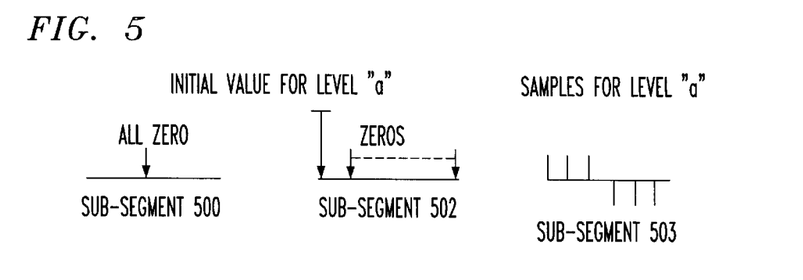
FIG. 5 shows the special training sequence.

In FIG. 3 an improved equalizer arrangement is shown in which the analog modem's slicer table 160 adaptively learns the slicing levels employed at the network interface and also selectively adjusts its feed forward (FF) equalizer 150 by employing the training sequence shown in FIG. 5. Advantageously, the FIG. 5 training sequence may be transmitted during the "DIL" intervals described in ITTU V.90.

During a first sub-segment of the FIG. 5 training sequence an all-zero or guard interval sub-segment 500 is transmitted to the client modem 101 in order to insulate this training sequence against intersymbol interference from any preceding sequence. The next part of the training sequence is sub-segment 502 which contains the initial value of the level being trained, followed by a set of zero level signals so that the signal for the level point being trained insulated against intersymbol interference from any other signals for that level. Sub-segment 502 establishes an initial value for the level to facilitate convergence and may also be used to learn the channel transfer function h(t) for tuning the equalizer. Referring to FIG. 3, if hf(n) is the pulse response of the forward equalizer FF, the output y(n) of FF is given by:

$$y(n) = \frac{1}{Lf} \sum_{k_1=0}^{Lf-1} x(n-k) hf(k)$$

where Lf is the number of taps of the equalizer. The equalizer taps may conveniently be adjusted according to an LMS algorithm given by:

$$hf_{k+1}(n) = hf_k(n) - \beta_f e_k x(n),$$

where $\beta_f$ is the step size of tap adjustment and $e_k$ is the error in the $k^{th}$ sample.

The third part of the training sequence is sub-segment 503 which contains additional points for the level being trained. The additional points for the level are of varying polarity and spaced to approximate the repetition rate to be used on the channel. Accordingly, the periodicity of these samples may be employed to enable the analog modem to obtain synchronization with the network interface. This three sub-segment level training procedure is repeated for each of the other levels (e.g., for a total of e.g., 128 levels) from which the adaptive slicer table 160 is adaptively updated. The algorithm for updating the slicer table is given by:

$$hs_{k+1}(n) = hs_k(n) + \beta_s e_k$$

Figure 4:
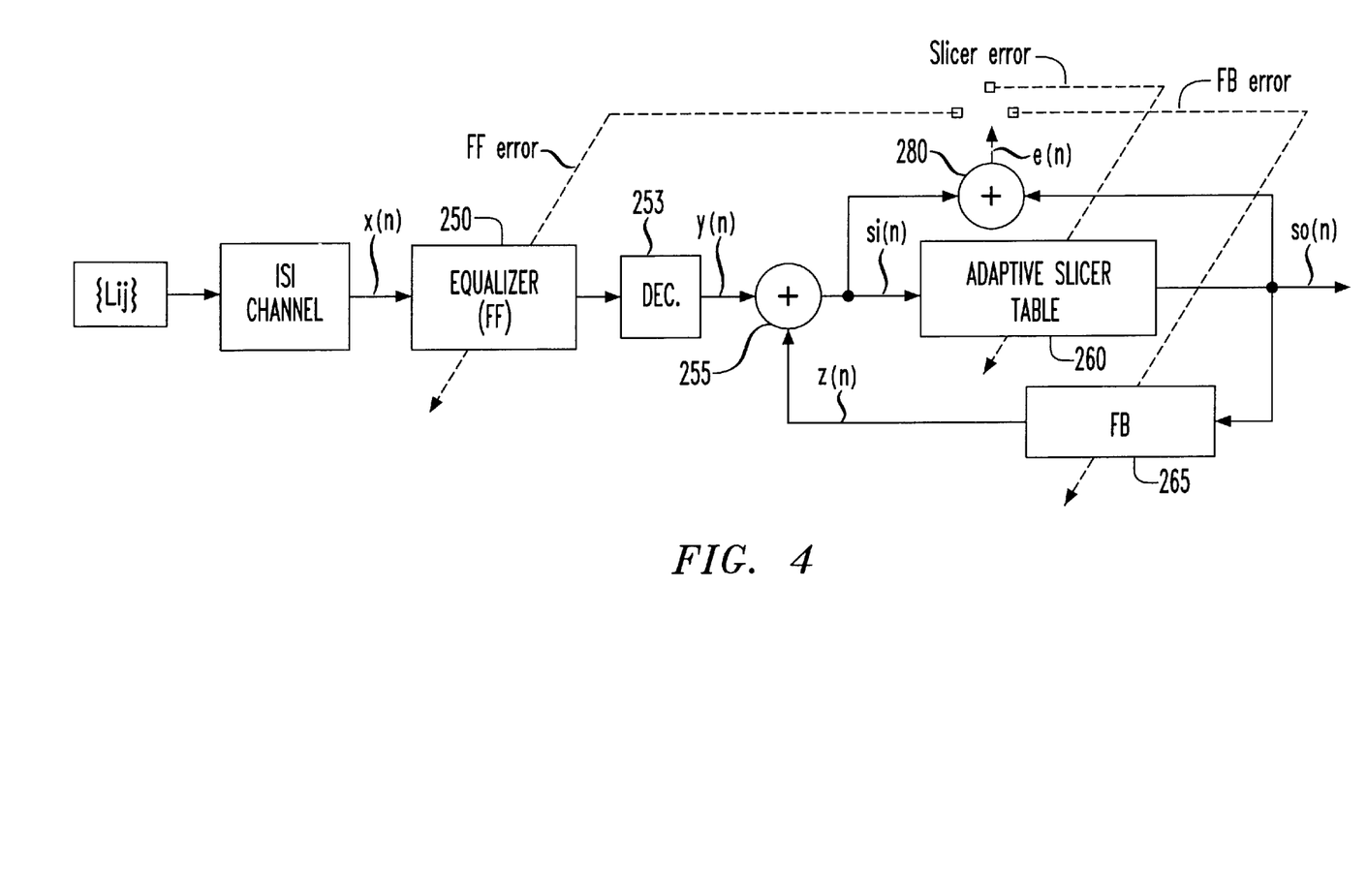
FIG. 4 shows an improved analog modem in which the slicer table is adaptively updated while the equalizers are fine tuned from the channel impulse response obtained from the special training sequence.
Figure 6:
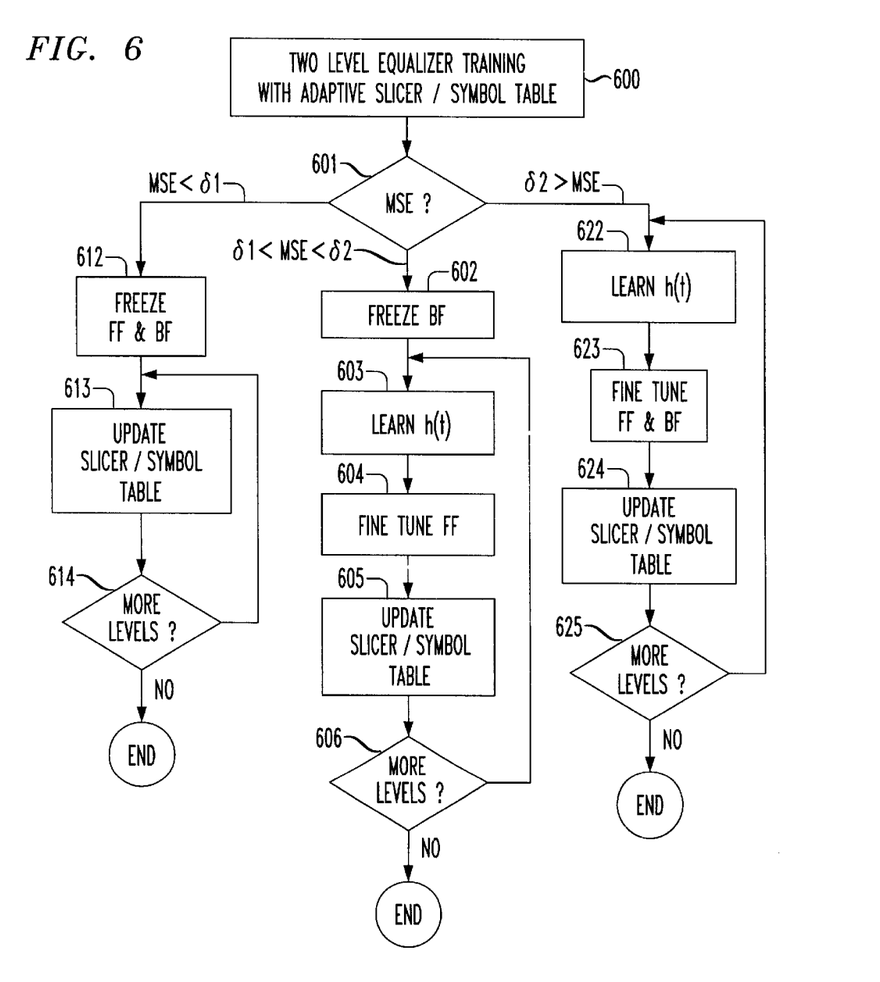
FIG. 6 is a flow chart of the process for updating the adaptive slicer table and fine tuning the feed forward and feedback filters of the equalizer according to the MSE between the input and output of the slicer.

Referring now to FIG. 4 a further improved structure is shown for learning the slicing levels and selectively adjusting the feedforward (FF) and feedbackward (FB) filters dependent upon the mean square error (MSE) between the slicer input and output, the flow chart for which is shown in FIG. 6.

Let it be again assumed that slicer table 260 has been preliminarily constructed by means of the prior art two-level equalizer training. As shown in FIG. 6 at box 601, the MSE between the input to and output of slicer 260 is measured. If the MSE measured in box 601 is less than some predetermined fraction δ1 of the distance between adjacent slicing levels, both feed forward (FF) filter 250 and feed backward (FB) filter 265 are fixed at step 612 while slicer table 260 continues to be adaptively updated at steps 613 and 614. Preliminarily, an average distance between adjacent levels may be used in step 601. If the error measured in box 601 is somewhat larger, i.e., δ1<MSE<δ2, feed backward filter FB 265 is frozen at step 602, the channel impulse response h(t) is ascertained at step 603, and feed forward filter 250 is fine tuned at step 604. Slicer table 260 continues to be adaptively updated at steps 613 and 614. If the mean square error measured at step 601 is, feed backward filter FF 250 is frozen at step 602, the channel impulse response h(t) is ascertained at step 603, feed forward filter 250 is fine tuned at step 604 and slicer table 260 is updated at steps 605 and 606. If the mean square error measured at step 601 is larger than the predetermined threshold, the channel impulse response h(t) is ascertained at step 622 and both the FF and FB filters are fine tuned at step 623. Slicer table 260 is adaptively updated at steps 624 and 625. The backward equalizer FB may be adjusted according to the following:

$$z(n) = \frac{1}{Lb} \sum_{k=0}^{Lb-1} so(n-k) hb(k)$$

where Lb is the number of taps of the feedback equalizer FB. The feedback equalizer FB may similarly be updated using an LMS algorithm according to:

$$hb_{k+1}(n) = hb_k(n) + \beta_b e_k so(n)$$

Figure 7:
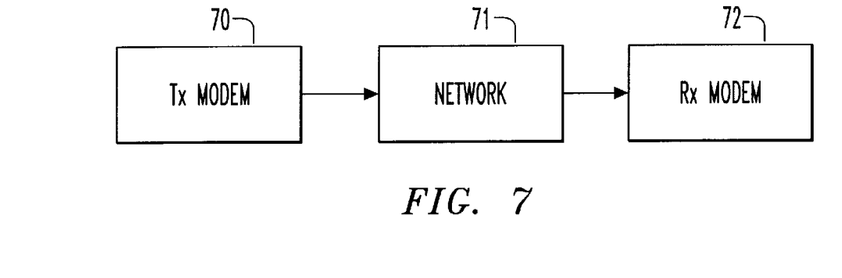
FIGS. 7, 8 and 9 illustrate robbed bit signaling on the digital transmission network.
Figure 8:
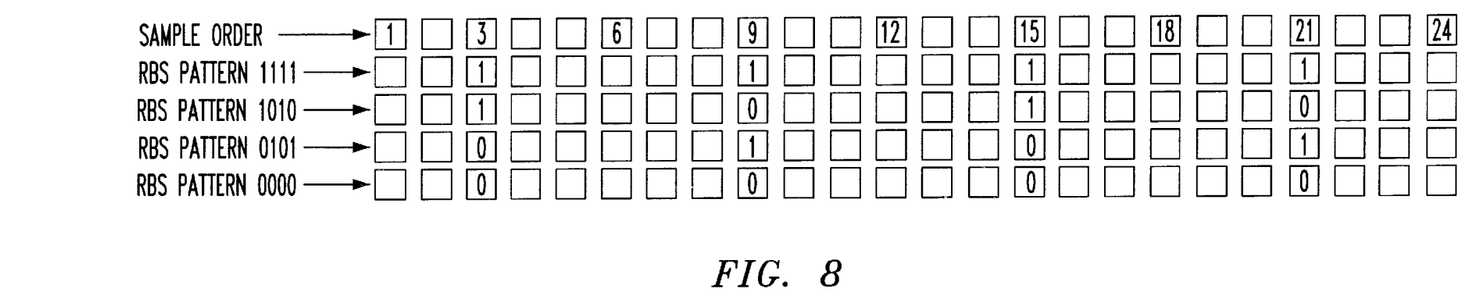
Figure 9:
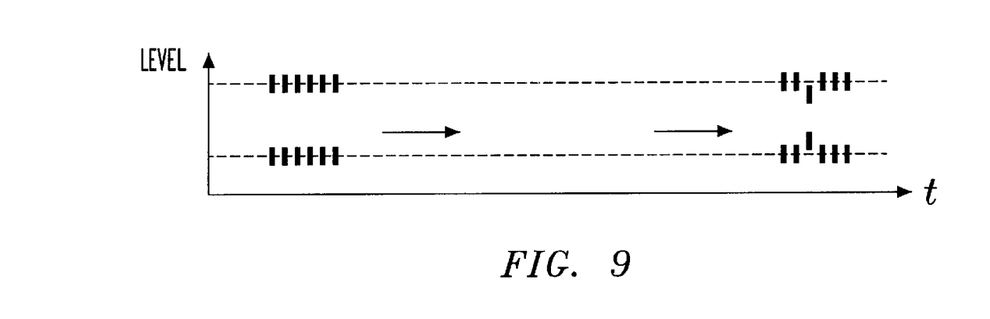

FIGS. 7, 8 and 9 illustrate the effects of robbed bit signaling often used in the digital transmission network 71 lying between a transmitting modem 70 and a receiving modem 72. As shown in FIG. 8, one common practice is to "rob" the most significant bit of the 8-bit PCM code used to encode a sample during a particular phase of the 24 phase PCM sequence. The robbed bit may be preempted to be either a 0 or a 1, depending on the four-bit RBS pattern desired by the network. RBS patterns such as 1111, 1010, 0101 or 1111 are commonly employed. In FIG. 8, bits are preempted from the 3d, $9^{th}$, $15^{th}$ and $21^{st}$ samples of the PCM sequence. In the prior art, it was the practice in the network to rob only even level PCM codes. Therefore, equalizers were trained on samples of a level that would not be subject to robbing. More recently, however, systems are being deployed that may rob any level.

Figure 10:
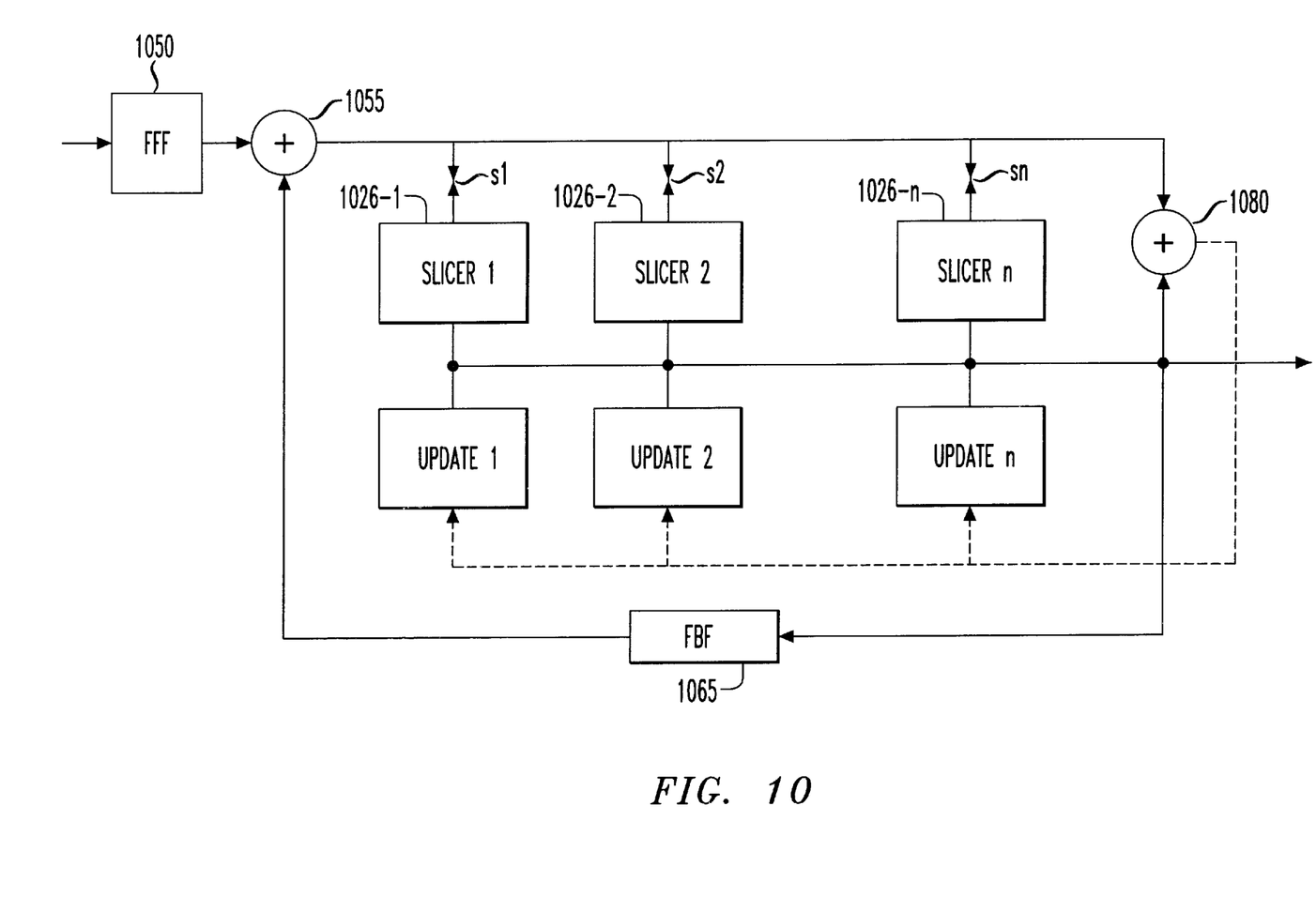
FIG. 10 shows a slicer table array for ascertaining slicing levels despite the presence of robbed bi tsignaling on the digital network.

In FIG. 9 the effect of bit robbing on a sample such as that which might be employed for training an equalizer is shown. At the left of FIG. 9 all six symbols of a sample training sequence are transmitted at the same level, presumably to allow the analog modem to register this level in constructing its slicer table. Unfortunately, if the training sequence passes through the digital network 71 of FIG. 7 one bit position may be robbed for RBS. FIG. 9 illustrates the effect of the network robbing a bit every sixth word in phase 3 of the 24 phase sequence of 8-bit words. Instead of all of the symbols arriving at the same level, the symbol transmitted in phase 3 has been robbed of its most significant bit for RBS purposes and so the level of the signal arriving in phase 3 at the right hand side of FIG. 9 will be different from the level of the other symbols of the training sequence. This injects a serious noise component into the level learning procedure and slows down the analog modem's construction of its slicer table. The noise introduced by RBS is ameliorated with the apparatus shown in FIG. 10. Since the analog modem has no way of knowing at the outset which phase will be robbed for RBS by the digital network, the apparatus of FIG. 10 contains an array of n slicers equal in number to the bit positions capable of being robbed. Each slicer attempts to ascertain the slicing level. N–1 of the slicers will have no difficulty ascertaining the slicing level because they are in positions that have not been selected for RBS at the digital network. By comparing the slicing levels obtaining at each of the n slicers, it can easily be determined which bit position is being robbed and the slicing level is ascertained on the basis of the symbols being received by the remaining slicers. The time at which each phase occurs is obtained from the periodicity of the third segment of the training sequence (FIG. 5) which enables the analog modem to synchronize to the network interface clock. This timing controls the sequential operation of switches 1026-1 through 1026-n. Accordingly, N–1 of the slicers will have no difficulty ascertaining the slicing level because they are in positions that have not been selected for RBS at the digital network. By comparing the slicing levels obtaining at each of the n slicers, it can easily be determined which bit position is being robbed and the slicing level is ascertained on the basis of the symbols being received by the remaining slicers.

The foregoing is deemed to be illustrative of the principles of the present invention. Further and other modifications will be apparent to those skilled in the art and may be made without, however, departing from the scope of the invention.

What is claimed is:

1. Apparatus for adapting an analog modem to ascertain the slicing levels employed in a digital data network which may periodically preempt one of n bit positions for network purposes, comprising:

a. means for storing samples of a training sequence received in each of said bit position;

b. means for ascertaining the least mean squared values of the samples received for each of said n bit positions; and c. means for establishing a slicing level on the basis of n–1 of said values.

2. A method of reducing the effects of noise sources in training an analog modem from samples of slicing levels transmitted in successive bit intervals through a digital transmission network comprising:

a. storing samples of a training sequence received during successive ones of said bit intervals;

b. computing the least mean squared values of the samples stored for each of said bit intervals; and c. ascertaining a slicing level from said computed mean square values by excluding samples stored during one of said bit intervals.

3. A method according to claim 2 wherein said excluded stored samples have a least mean squared value differing from the remaining ones of said computed values.

4. A method of reducing the effects of noise sources in training an analog modem from samples of slicing levels transmitted over a channel in successive bit intervals from an interface to a digital transmission network, said modem having an equalizer, comprising:

a. training said equalizer from a two-level sequence received from said interface;

b. ascertaining the slicing levels employed at the digital interface from samples of said slicing levels received from said interface;

c. ascertaining from said samples the channel impulse response at each of said levels; and d. adjusting said equalizers in accordance with said impulse response.

5. A method of reducing the effects of noise sources in accordance with claim 4 further comprising iteratively adjusting said equalizers and said slicer tables in accordance with said samples.

6. A method of reducing the effects of noise sources in accordance with claim 4 wherein said modem synchronizes to the clock rate of said samples received from said network interface.

* * * * *